(12) United States Patent
Buttler

(10) Patent No.: US 12,203,791 B2
(45) Date of Patent: Jan. 21, 2025

(54) METHOD OF CORRECTING FLOW METER VARIABLE

(71) Applicant: MICRO MOTION, INC., Boulder, CO (US)

(72) Inventor: Marc Allan Buttler, Erie, CO (US)

(73) Assignee: MICRO MOTION, INC., Boulder, CO (US)

( * ) Notice: Subject to any disclaimer, the term of this patent is extended or adjusted under 35 U.S.C. 154(b) by 267 days.

(21) Appl. No.: 17/794,127

(22) PCT Filed: Jan. 31, 2020

(86) PCT No.: PCT/US2020/016181
§ 371 (c)(1),
(2) Date: Jul. 20, 2022

(87) PCT Pub. No.: WO2021/154289
PCT Pub. Date: Aug. 5, 2021

(65) Prior Publication Data
US 2023/0051187 A1    Feb. 16, 2023

(51) Int. Cl.
*G01F 15/02* (2006.01)
*G01F 1/84* (2006.01)

(52) U.S. Cl.
CPC ............ *G01F 15/024* (2013.01); *G01F 1/845* (2013.01)

(58) Field of Classification Search
None
See application file for complete search history.

(56) References Cited

U.S. PATENT DOCUMENTS

| | | | |
|---|---|---|---|
| 2004/0261541 A1 | 12/2004 | Hussain | |
| 2007/0084298 A1 | 4/2007 | Rieder et al. | |
| 2008/0034893 A1 | 2/2008 | Stappert et al. | |
| 2011/0029259 A1* | 2/2011 | Cunningham | ........ G01F 1/8477 702/45 |
| 2014/0076408 A1 | 3/2014 | Zimmer et al. | |
| 2014/0190274 A1 | 7/2014 | Dahari | |

(Continued)

FOREIGN PATENT DOCUMENTS

| | | |
|---|---|---|
| AU | 2011239253 A1 | 11/2011 |
| CN | 110726444 A | 1/2020 |
| DE | 102005046319 A1 | 3/2007 |

(Continued)

*Primary Examiner* — Patrick Assouad
*Assistant Examiner* — Mark A Shabman
(74) *Attorney, Agent, or Firm* — The Ollila Law Group LLC

(57) ABSTRACT

A method for correcting a flow variable (509) based on an inner pressure inside a Coriolis flow meter (202) comprises the steps of receiving a first outside pressure (503) measured with a first pressure sensor (204) located in a first process conduit (208a) positioned on a first end (212a) of the Coriolis flow meter (202), determining a second outside pressure (505) in a second process conduit (208b) positioned on a second end (212b) opposing the first end (212a) of the Coriolis flow meter (202), determining an estimated inner flow meter pressure (507) based on the first outside pressure (503) and the second outside pressure (505), receiving the flow variable (509), and generating a corrected flow variable (512) based on the estimated inner flow meter pressure (507), a pressure compensation factor (510), and the flow variable (509).

21 Claims, 5 Drawing Sheets

(56) References Cited

U.S. PATENT DOCUMENTS

2015/0160056 A1* 6/2015 Schollenberger ...... G01N 9/002
73/861.357

FOREIGN PATENT DOCUMENTS

| EP | 1661766 | B1 | 9/2007 | | |
|----|---------|----|--------|---|---|
| JP | 2005175809 | A | 6/2005 | | |
| WO | 2008011587 | A2 | 1/2008 | | |
| WO | 2009134268 | A1 | 11/2009 | | |
| WO | 2011068500 | A1 | 6/2011 | | |
| WO | WO-2017135954 | A1 * | 8/2017 | ........... | G01F 1/8436 |

\* cited by examiner

METHOD OF CORRECTING FLOW METER VARIABLE

TECHNICAL FIELD

The embodiments described below relate to methods of correcting measured Coriolis flow meter variables, more particularly, to correct a measured Coriolis flow meter variable for the effect on the measurement caused by changes in internal pressure.

BACKGROUND

Coriolis flow meters may be used to measure the mass flow rate, density, volume flow rate, and other information for a process fluid.

FIG. 1 depicts example Coriolis flow meter 100 comprising a meter assembly 10 and meter electronics 20. Meter assembly 10 responds to changes in a process fluid flow. Meter electronics 20 is connected to meter assembly 10 via leads 102, and provides density, volumetric flow rate, and mass flow rate information to operators over meter electronics interface 26, in addition to other information.

Meter assembly 10 includes manifolds 150 and 150', flanges 103 and 103', parallel flow tubes 130 and 130', driver 180, and velocity pick-off sensors 170L and 170R. Flow tubes 130 and 130' bend at two symmetrical locations along their length and are essentially parallel throughout their length. Brace bars 140 and 140' serve to define an axis about which each flow tube oscillates.

When flanges 103 and 103' are connected, via inlet end 104 and exit end 104' to a process line (not shown), process fluid enters inlet end 104 of the meter through flange 103 and is conducted through manifold 150. Manifold 150 divides and routes the process fluid through flow tubes 130 and 130'. Upon exiting flow tubes 130 and 130', the process fluid is recombined in a single stream by manifold 150' and routed to outlet end 104', connected by flange 103' to the process line (not shown).

Both flow tubes 130 and 130' are driven by driver 180 in opposite directions in a first out-of-phase bending mode of the flowmeter. This driver 180 may comprise any one of many well-known arrangements, such as a magnet mounted to flow tube 130' and an opposing coil mounted to flow tube 130 and through which an alternating current is passed for vibrating both flow tubes. A suitable driver voltage is applied by meter electronics 20 to driver 180.

Meter electronics 20 provides the drive signal to driver 180 to vibrate flow tubes 130 and 130' over leads 102. Meter electronics 20 receives the left and right velocity signals from velocity pick-off sensors 170L and 170R over leads 102 to compute the mass flow rate, volumetric rate, and/or density information for the flow passing through meter assembly 10.

In some flow meter applications, for example in oil and gas production, a high degree of meter accuracy is required. Different internal line pressures can correspond to different flow tube stiffnesses, however, and flow tube stiffness affects the sensitivity to Coriolis forces and the natural frequency of the meter flow tubes. Some Coriolis meter designs therefore experience a bias in flow and/or density measurements due to the effect of internal line pressure on the vibration characteristics of the meter flow tubes.

Because the walls of a flow tube tend to be thin to achieve the sensitivity needed for flow and density measurements, it is not feasible to include a pressure tap to measure the pressure within the flow tubes. Therefore, some operators of prior art meters provide a pressure measurement tap outside the flow meter to measure the pressure of the process fluid in the connecting process conduit. Generally, operators position these pressure taps upstream of the flow meter to avoid viscous drag. Alternatively, some operators assume a fixed line pressure based on reasonable experience and knowledge of the process control as it affects the line pressure in the system.

Using either the measured upstream line pressure or the assumed line pressure, prior art meters apply a pressure compensation factor to the flow meter measurements based on the externally measured pressure to correct for changes in meter stiffness. The pressure compensation factor, which represents a ratio of line pressure to the required measurement correction for change in stiffness due to pressure, is determined via type testing at the factory. Generally, the pressure compensation factor is a universal coefficient that is determined for a specific model of flow meter, or for all meters of a similar size and design.

There may, however, be substantial differences in pressure outside a flow meter and within the meter flow tubes. Even if the difference in pressure between an outside pressure tap and a flow tube is precisely known at one point in time, further uncertainty in the pressure differential can accrue, resulting in additional flow variable measurement errors. For example, Bernoulli effects on a fluid can cause the pressure inside the meter flow tubes to increase or decrease relative to the pressure outside the flow meter if the cross-sectional area and velocity is different within the flow tubes versus outside the flow tubes in the process conduit. The difference in pressure between the outside pressure tap and the flow meter tubes can also change after the type testing, for example due to the accumulation of coatings within the flow meter. Increasing the flow through the flow meter can cause further pressure losses between the pressure tap and the inside of the flow tubes. Increasing the viscosity of the process fluid under test can cause further pressure loss between the pressure tap and the inside of the flow tubes. These differences in pressure between the inside of the flow tubes and outside the flow meter may introduce errors into the flow meter measurements.

In some instances, installation conditions do not allow for the pressure tap to be installed on the same side of the meter (i.e., upstream or downstream) as the pressure tap location during the calibration type-testing. In such cases, there will be a further uncertainty in the flow meter measurements, because the pressure used to make the correction for change in flow tube stiffness will be even less precisely known. This problem also applies to bi-directional flow installations where the upstream or downstream location of the pressure tap will alternate as the flow direction alternates forward and backward through the meter.

What is needed is a more accurate way to correct a flow meter measurement for changes in stiffness resulting from changes in the internal pressure.

SUMMARY

In a first embodiment, a method for correcting a flow variable based on an inner pressure inside a Coriolis flow meter is provided. The method comprises the step of receiving a first outside pressure measured with a first pressure sensor located in a first process conduit positioned on a first end of the Coriolis flow meter. The method further comprises the step of determining a second outside pressure in a second process conduit positioned on a second end opposing the first end of the Coriolis flow meter. The method further comprises the step of determining an estimated inner flow meter pressure based on the first outside pressure and the second outside pressure. The method further comprises the step of receiving the flow variable. The method further comprises the step of generating a corrected flow variable based on the estimated inner flow meter pressure, a pressure compensation factor, and the flow variable.

In a second embodiment, an electronics for correcting a flow variable based on an inner pressure inside a Coriolis flow meter is provided. The electronics comprises an interface for receiving a first outside pressure from a first pressure sensor, and a processing system in communication with the interface, with the processing system configured to receive a first outside pressure measured with a first pressure sensor located in a first process conduit positioned on a first end of the Coriolis flow meter, determine a second outside pressure in a second process conduit positioned on a second end opposing the first end of the Coriolis flow meter, determine an estimated inner flow meter pressure based on the first outside pressure and the second outside pressure, receive the flow variable, and generate a corrected flow variable based on the estimated inner flow meter pressure, a pressure compensation factor, and the flow variable.

In a third embodiment, a flow meter correction system configured to correct a flow variable based on an inner pressure inside a Coriolis flow meter. The system comprises a first pressure receiving module configured to receive a first outside pressure from a first pressure sensor located in a first process conduit positioned on a first end of the Coriolis flow meter, a second pressure receiving module for determining a second outside pressure in a second process conduit positioned on a second end opposing the first end of the Coriolis flow meter, an inner flow meter pressure estimation module configured to determine an estimated inner flow meter pressure based on the first outside pressure and the second outside pressure, a flow variable receiving module configured to receive a flow variable, and a flow variable correction module configured to generate a corrected flow variable based on the estimated inner flow meter pressure, a pressure compensation factor, and the flow variable.

Aspects

According to a further aspect, determining the second outside pressure may be based on a pressure loss coefficient, a fluid velocity, a fluid viscosity, and a density.

According to a further aspect, determining the second outside pressure may further comprise receiving a second outside pressure measurement from a second pressure sensor located in the second process conduit.

According to a further aspect, determining the estimated inner flow meter pressure based on the first outside pressure and the second outside pressure may further comprise averaging the first outside pressure and the second outside pressure.

According to a further aspect, determining the estimated inner pressure may further be based on a cross-sectional area of a process conduit, a diameter of the process conduit, a cross-sectional area of a flow tube of the Coriolis flow meter, a measured density p, and a measured flow rate M.

According to a further aspect, the pressure compensation factor may be correlated to a pressure inside the flow tubes.

According to a further aspect, the flow variable may be at least one of: a mass flow, a volume flow, or a density.

According to a further aspect, determining the estimated inner flow meter pressure may be further based on a flow meter direction.

According to a further aspect, the processing system may be further configured to determine the second outside pressure based on a pressure loss coefficient, a fluid velocity, a fluid viscosity, and a density.

According to a further aspect, the processing system may be further configured to determine the second outside pressure by receiving a second outside pressure measurement from a second pressure sensor located in the second process conduit.

According to a further aspect, the processing system may be further configured to determine the estimated inner flow meter pressure based on the first outside pressure and the second outside pressure by averaging the first outside pressure and the second outside pressure.

According to a further aspect, the processing system may be further configured to determine the estimated inner pressure based on a cross-sectional area of a process conduit, a diameter of the process conduit, a cross-sectional area of a flow tube of the Coriolis flow meter, a measured density p, and a measured flow rate M.

According to a further aspect, the pressure compensation factor may be correlated to a pressure inside the flow tubes.

According to a further aspect, the flow variable may be at least one of: a mass flow, a volume flow, or a density.

According to a further aspect, determining the estimated inner flow meter pressure may be further based on a flow meter direction.

According to a further aspect, the second pressure receiving module may be further configured to determine the second outside pressure based on a pressure loss coefficient, a fluid velocity, a fluid viscosity, and a density.

According to a further aspect, the second pressure receiving module may be further configured to receive a second outside pressure measurement from a second pressure sensor located in the second process conduit.

According to a further aspect, the inner flow meter pressure estimation module may be further configured to average the first outside pressure and the second outside pressure.

According to a further aspect, the inner flow meter pressure estimation module may be further configured to determine the estimated inner pressure based on a cross-sectional area of a process conduit, a diameter of the process conduit, a cross-sectional area of a flow tube of the Coriolis flow meter, a measured density p, and a measured flow rate M.

According to a further aspect, the pressure compensation factor may be correlated to a pressure inside the flow tubes.

According to a further aspect, the flow variable may be at least one of: a mass flow, a volume flow, or a density.

According to a further aspect, the inner flow meter pressure estimation module may be further configured to determine the estimated inner flow meter pressure based on a flow meter direction.

BRIEF DESCRIPTION OF THE DRAWINGS

The same reference number represents the same element on all drawings. It should be understood that the drawings are not necessarily to scale.

DETAILED DESCRIPTION

FIGS. 2-5 and the following description depict specific examples to teach those skilled in the art how to make and use the best mode of the Application. For the purpose of teaching inventive principles, some conventional aspects have been simplified or omitted. Those skilled in the art will appreciate variations from these examples that fall within the scope of the Application. Those skilled in the art will appreciate that the features described below may be combined in various ways to form multiple variations of the Application. As a result, the Application is not limited to the specific examples described below, but only by the claims and their equivalents.

Figure 1:
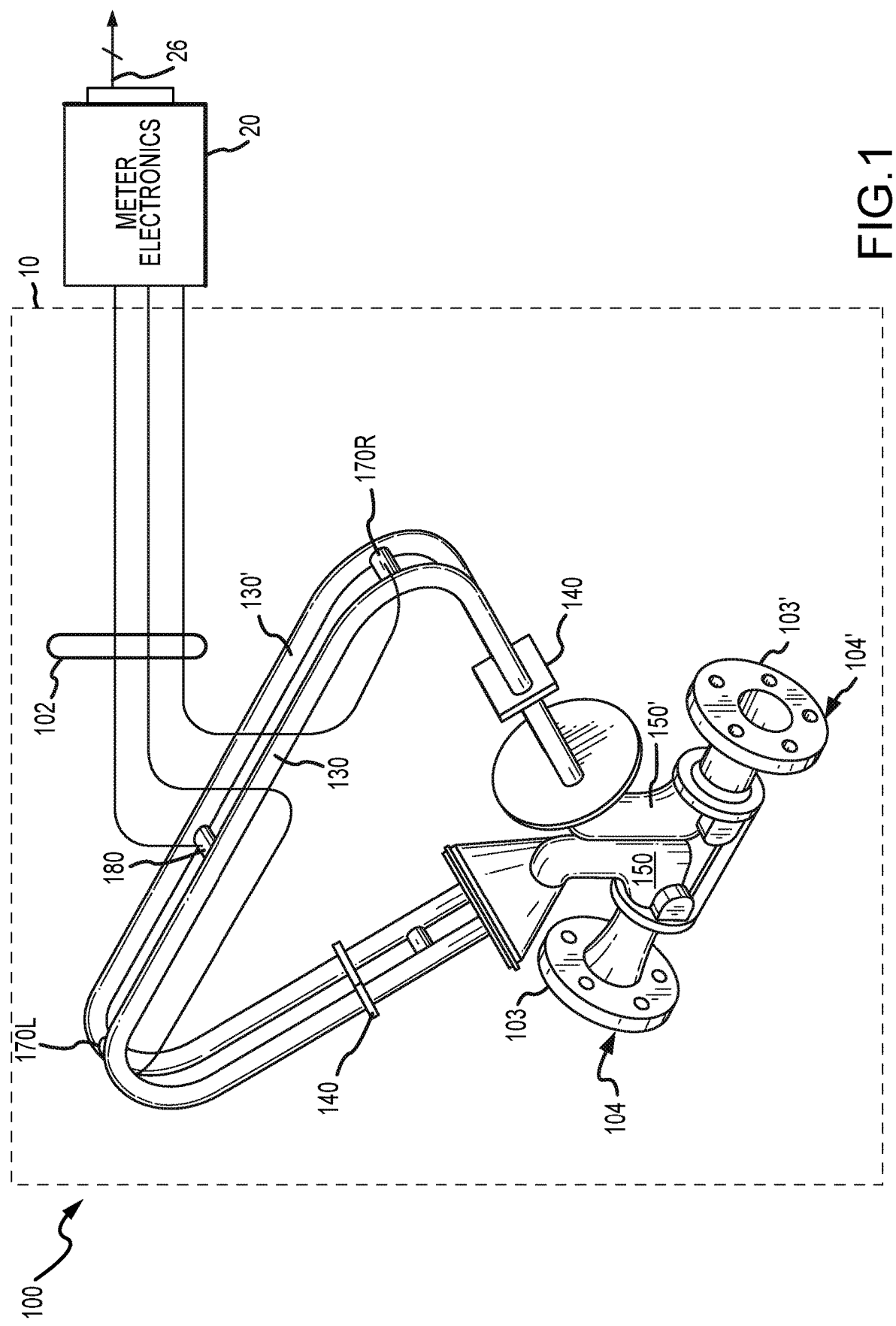
FIG. 1 depicts a flow meter 100, in accordance with an embodiment.
Figure 2:
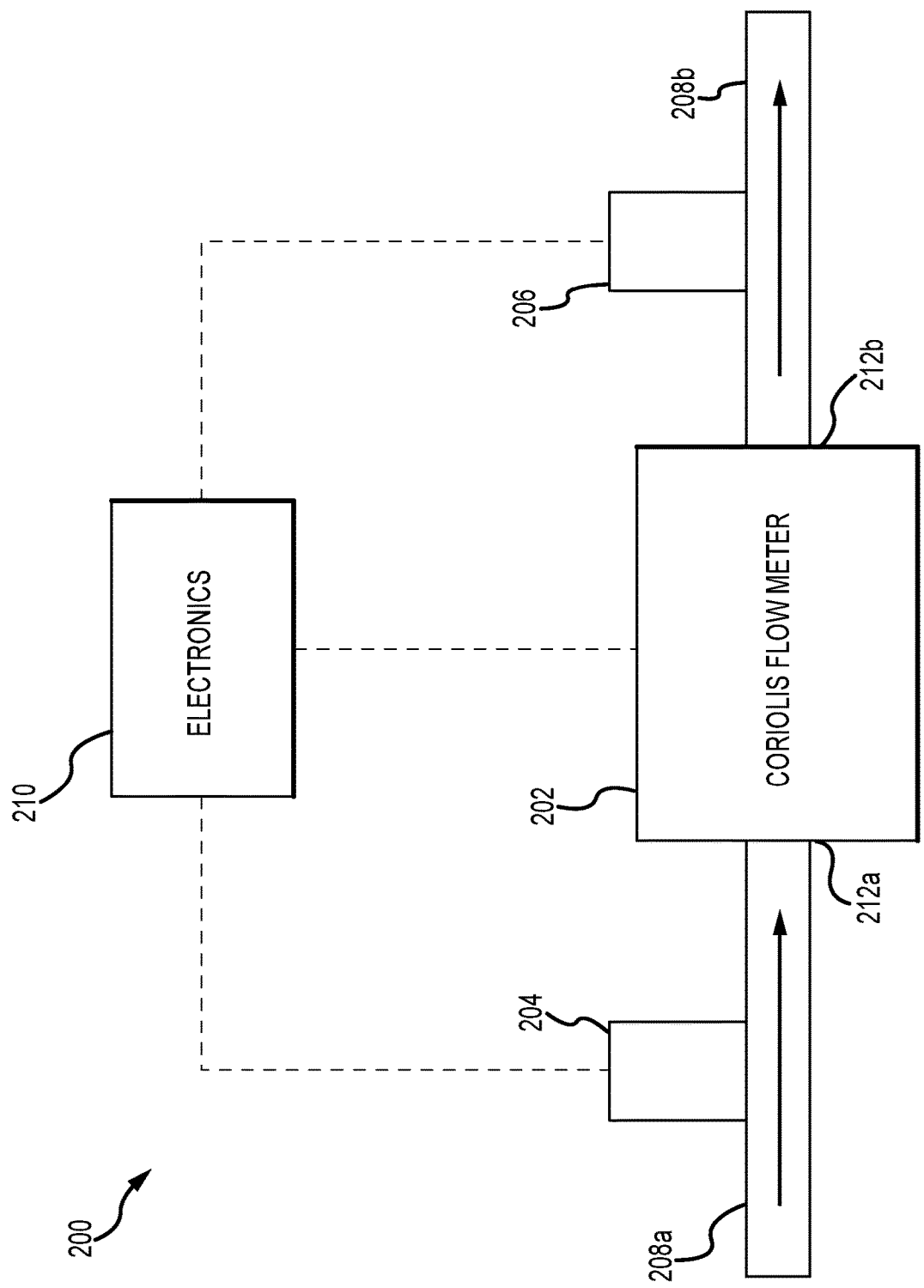
FIG. 2 depicts a flow meter system 200, in accordance with an embodiment.

FIG. 2 depicts flow meter system 200, in accordance with an embodiment. Flow meter system 200 may be used to correct a flow variable based on an inner pressure inside a Coriolis flow meter. Flow meter system 200 may include a Coriolis flow meter 202, a first pressure sensor 204, a first process conduit 208a, a second process conduit 208b, and an electronics 210.

In embodiments, Coriolis flow meter 202 may be similar to Coriolis flow meter sensor 100. In further embodiments, however, the Coriolis flow meter 202 sensor may include a different configuration. For example, Coriolis flow meter 202 may comprise one or more flow tubes that are straight or curved, as will be understood by those of skill.

In FIG. 2, the process fluid enters and exits Coriolis flow meter 202 via first process conduit 208a and second process conduit 208b. In the embodiment depicted, first process conduit 208a is associated with a fluid inlet at a first end 212a, and second process conduit 208b is associated with a fluid outlet at a second end 212b of Coriolis flow meter 202. This is not intended to be limiting, however. In embodiments, second process conduit 208b and second end 212b may be associated with an inlet. In further embodiments, flow meter system 200 may be bidirectional, meaning that each of first end 212a and second end 212b may alternatingly serve as an inlet or an outlet.

In embodiments, first pressure sensor 204 may comprise any type of sensor, including, but not restricted to a resistive, capacitive, piezoelectric, optical, or MEMS pressure sensor or transducer.

In embodiments, flow meter system 200 may further comprise an electronics 210. Electronics 210 may be used to correct a flow variable based on an inner pressure within the Coriolis flow meter 202. In embodiments, electronics 210 may provide a corrected flow variable to an operator.

Electronics 210 is in communication with first pressure sensor 204 and either a meter electronics 20 or a meter assembly 10 associated with Coriolis flow meter 202. In further embodiments, electronics 210 may further be in communication with second pressure sensor 206. In embodiments, electronics 210 may provide a further interface to provide corrected flow variable information to an operator.

In embodiments, flow meter system 200 may comprise both electronics 210 and a meter electronics 20 associated with Coriolis flow meter 202. Alternatively, electronics 210 may comprise the only electronics for flow meter system 200, meaning that electronics 210 further provides the functions described with regards to meter electronics 20 above for Coriolis flow meter 202.

In further embodiments, flow meter system 200 may comprise a second pressure sensor 206. Second pressure sensor 206 may be the same type as, or a different type from first pressure sensor 204.

Figure 3:
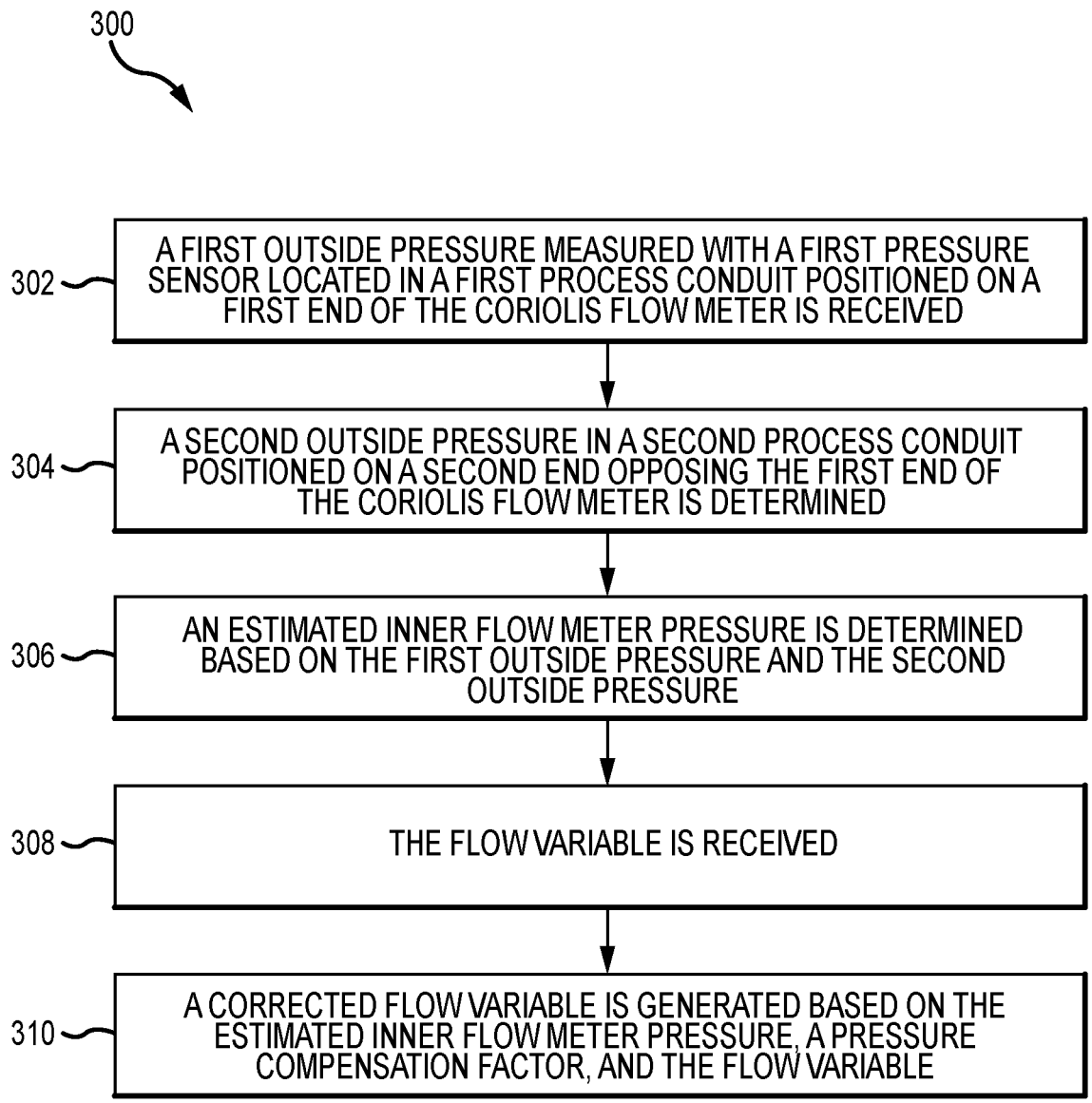
FIG. 3 depicts a method 300, in accordance with an embodiment.

FIG. 3 depicts method 300, in accordance with an embodiment. Method 300 may be used to correct a flow variable based on an inner pressure inside a Coriolis flow meter. In embodiments, method 300 may be executed by electronics 210. In embodiments, the flow variable may comprise at least one of a mass flow, a volume flow, or a density measurement.

Method 300 begins with step 302. In step 302, a first outside pressure measured with a first pressure sensor located in a first process conduit positioned on a first end of the Coriolis flow meter is received. For example, a signal may be received from first pressure sensor 204 indicating a pressure of a process fluid in first process conduit 208a positioned at first end 212a.

Method 300 continues with step 304. In step 304, a second outside pressure in a second process conduit positioned on a second end opposing the first end of the Coriolis flow meter is determined.

In embodiments, determining the second outside pressure may be based on one or more pressure loss coefficients that are characteristic of the meter, in addition to a fluid velocity, a density, and a viscosity. The physics causing the pressure drop experienced by viscous flows across a section of conduit is described in several classic introduction to fluid mechanics textbooks. The one or more pressure loss coefficients characterize the pressure loss across at least a section of Coriolis flow meter, for example Coriolis flow meter 202. In embodiments, one or more of the pressure loss coefficients may comprise one or more predetermined values measured at the factory or determined based on a computational model. In embodiments, the one or more pressure loss coefficients may represent losses due to pipe friction and/or the physical features of the flow meter such as manifolds 150, 150', flanges 103, 103', the bends in the flow tubes 130, 130', or any other physical feature known to those of skill. The fluid velocity may be determined based on a mass flow rate and density measured with Coriolis flow meter 202, and the cross-sectional area of the flow tube 130, 130'. With the pressure loss coefficient and fluid velocity, it is possible to determine a second outside pressure using the Darcy-Weisbach equation, or any other method known to those of skill.

In embodiments, fluid viscosity may be measured outside of flow meter system 200 and transmitted to electronics 210, or it may be entered by an operator based on a known process fluid. The density may be measured by Coriolis flow meter 202.

In further embodiments, determining the second outside pressure may comprise receiving a second outside pressure measurement located in the second process conduit. For example, in embodiments of flow meter system 200 that include second pressure sensor 206, it may be possible to determine the second outside pressure using second pressure sensor 206.

Method 300 continues with step 306. In step 306, an estimated inner flow meter pressure is determined based on the first outside pressure and the second outside pressure.

In embodiments, determining the estimated inner flow meter pressure comprises averaging the first outside pressure and the second outside pressure. For example, an estimated inner flow meter pressure $P_{inner\_1A}$ may be determined via Equation 1A:

$$P_{inner\_1A} = \frac{1}{2}(P_{upstream} + P_{downstream}) = P_{upstream} - \frac{1}{2}\Delta p. \quad \text{(Equation 1A)}$$

In Equation 1A, $P_{upstream}$ may comprise the first outside pressure, and $P_{downstream}$ may comprise the second outside pressure. $\Delta p$ represents the pressure loss between the first outside pressure and the second outside pressure, which in embodiments may comprise the pressure loss over Coriolis flow meter 202, or over Coriolis flow meter 202 and parts of first process conduit 208a and second process conduit 208b.

In further embodiments, determining an estimated inner flow meter pressure based on the first outside pressure and the second outside pressure may further comprise accounting for a Bernoulli effect in the estimated inner flow meter pressure. Accounting for the Bernoulli effect in the estimated inner flow meter pressure may further comprise determining the estimated inner pressure based on a cross-sectional area of a process conduit, a diameter of the process conduit, a cross-sectional area of a flow tube of the Coriolis flow meter, a measured density $\rho$, and a measured mass flow rate M.

In embodiments, Equation 2 may be used to further correct the estimated inner flow meter pressure $P_{inner\_1}$, which may comprise the estimated inner flow meter pressure $P_{inner\_1A}$ described in Equation TA or the estimated inner flow meter pressure $P_{inner\_1B}$ described in Equation 1B below, to provide a further estimated inner flow meter pressure $P_{inner\_2}$:

$$P_{inner\_2} = P_{inner\_1} + \frac{1}{2} \times \rho \times v_{pipe}^2 - \frac{1}{2} \times \rho \times v_{meter}^2. \quad \text{(Equation 2)}$$

In Equation 2, $P_{inner\_2}$ represents an estimated pressure in the flow tubes 130, 130' after correction for the Bernoilli effect, $\rho$ represents the density of the process fluid measured by Coriolis flow meter 202, $v_{pipe}$ represents the velocity of the process fluid in the first process conduit 208a where first pressure sensor 204 is located, and $v_{meter}$ represents the velocity of the process fluid in flow tubes 130, 130'. Equation 3 provides the velocity of the process fluid $v_{pipe}$ in the first process conduit 208a:

$$v_{pipe} = \frac{M}{\rho \times A_{pipe}} = \frac{M}{\rho \times \frac{\pi d^2}{4}}. \quad \text{(Equation 3)}$$

In Equation 3, M is the mass flow rate measured by Coriolis flow meter 202, $A_{pipe}$ is the cross-sectional area of first process conduit 208a, and d is the diameter of first process conduit 208a. Equation 4 provides the velocity of the process fluid $v_{meter}$ in the flow tubes 130,130':

$$v_{meter} = \frac{M}{\rho \times A_{meter}}. \quad \text{(Equation 4)}$$

In Equation 4, $A_{meter}$ is the combined cross-sectional area of flow tubes 130, 130' of Coriolis flow meter 202.

In embodiments, estimated inner flow meter pressure $P_{inner\_1}$ and further estimated inner flow meter pressure $P_{inner\_2}$ may allow for a more accurate correction of a flow meter variable for changes in meter stiffness.

In embodiments of flow meter system 200, Coriolis flow meter 202 may support both installations where a second pressure sensor 206 is located downstream in the second process conduit 208b and installations where the meter is used for bidirectional flow measurement such that pressure sensors 204 and/or 206 will be alternately located upstream or downstream as the flow direction alternates between forward and backward. Determining the estimated inner flow meter pressure may therefore be further based on a flow meter direction. In further embodiments of step 306, when the flow direction is reversed during bidirectional flow, $P_{upstream}$ may comprise a pressure inside second process conduit 208b, and $P_{downstream}$ may comprise a pressure inside first process conduit 208a. In such embodiments where only one pressure transmitter is available and it happens to be in the downstream position, Equation 1A may take the alternative form:

$$P_{inner\_1B} = \frac{1}{2}(P_{upstream} + P_{downstream}) = P_{downstream} + \frac{1}{2}\Delta p. \quad \text{(Equation 1B)}$$

Method 300 continues with step 308. In step 308, the flow variable is received. In embodiments, the flow variable may comprise a density, a mass flow, or a volumetric flow of process fluid measured with Coriolis flow meter 202. In embodiments, the flow variable may be received from a meter electronics 20 associated with Coriolis flow meter 202, it may be read out of electronic storage from electronics 210, or it may be determined using raw pick-off sensor data received from a meter assembly 10 of Coriolis flow meter 202.

Method 300 continues with step 310. In step 310, a corrected flow variable is generated based on the estimated inner flow meter pressure, a pressure compensation factor, and the flow variable. The corrected flow variable represents the measured flow variable corrected for a change in pressure in the flow tubes.

The pressure compensation factor relates the pressure within the flow meter to a measurement correction for the change in flow tube stiffness. In embodiments, the pressure compensation factor may be determined during type-testing at the flow meter factory. The pressure compensation factor may be related to a particular model of flowmeter, a family of flow meter models comprising a similar size and design, or a single flow meter.

In embodiments, the corrected flow variable may be determined by multiplying the pressure compensation factor by the inner flow meter pressure. For example, Equation 5 may be used:

$$X_{corrected} = X_{measured} + (P_{inner} - P_{baseline}) * K, \quad \text{(Equation 5)}$$

where $X_{corrected}$ is the corrected flow variable, $X_{measured}$ is the measured flow variable, $P_{inner}$ is the estimated inner flow meter pressure, corresponding to $P_{inner\_1}$ or $P_{inner\_2}$ described above, $P_{baseline}$ is the pressure that was recorded as the inner pressure at the time when the meter was last calibrated against a reference standard, and K is the pressure compensation factor.

In embodiments, pressure compensation factor K may be correlated to the pressure inside the flow tubes during type testing. This may provide an improved correction of a flow variable for pressure over the prior art methods that use a pressure compensation factor K correlated to a position of the first pressure sensor 204.

Figure 4:
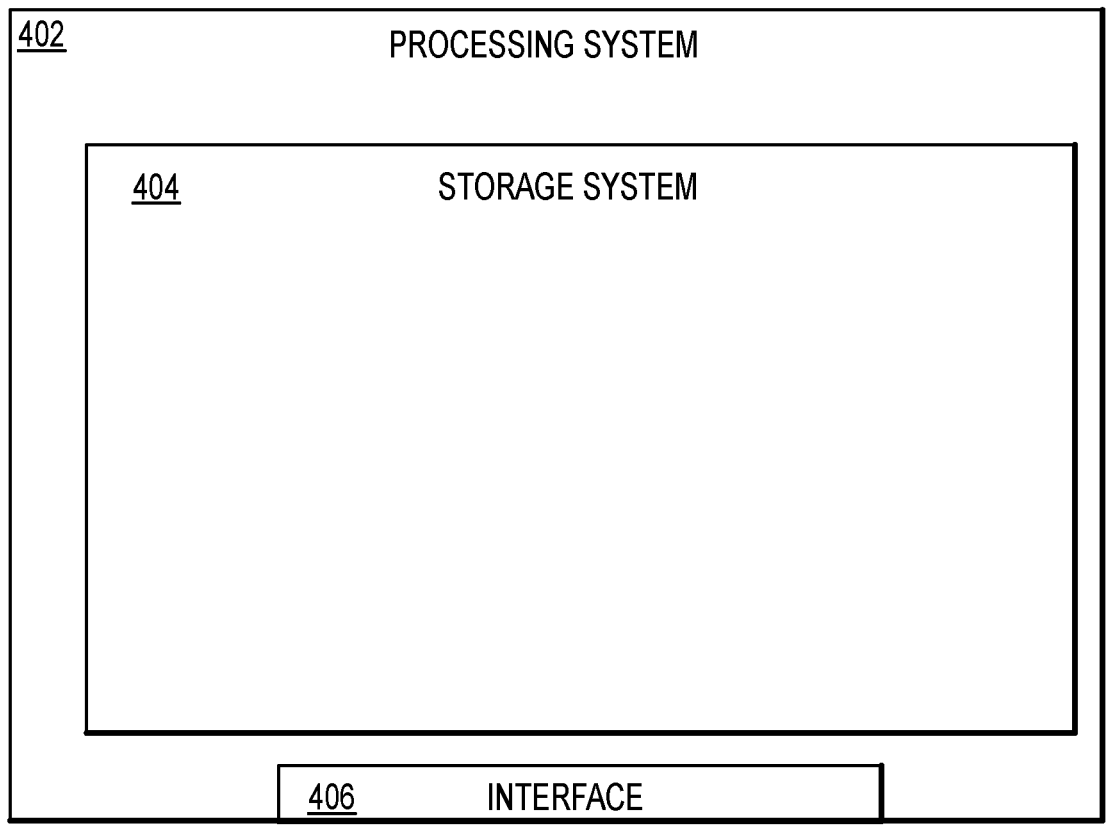
FIG. 4 depicts electronics 400, in accordance with an embodiment.

FIG. 4 depicts an electronics 400 in accordance with an embodiment. Electronics 400 comprises a processing system 402, a storage system 404, and an interface 406. Electronics 400 may be used to correct a flow variable based on an inner pressure inside a Coriolis flow meter.

Figure 5:
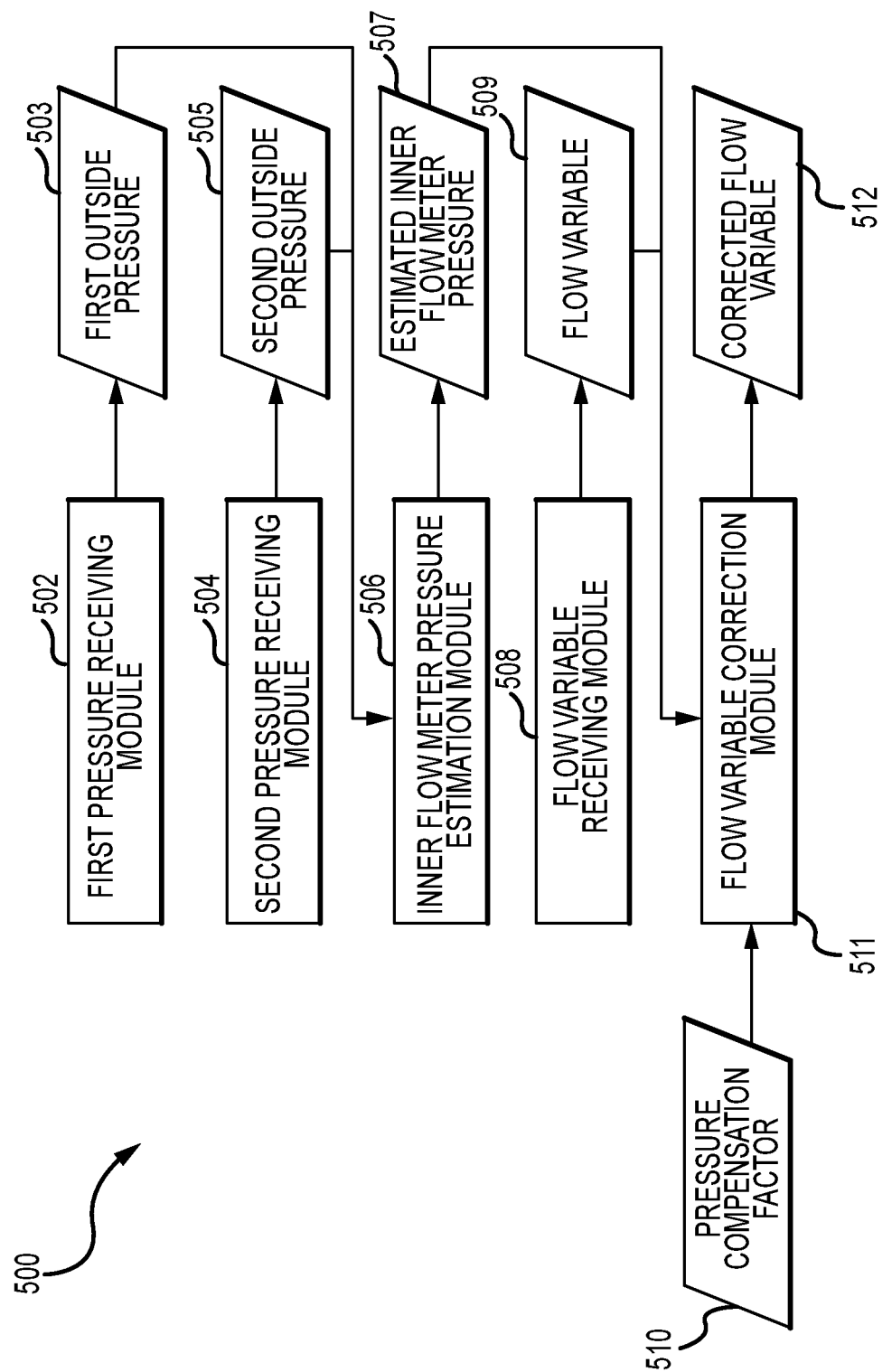
FIG. 5 depicts system 500, in accordance with an embodiment.

Processing system 402 may be configured to execute computer instructions, which, when executed on electronics 400, perform a portion or all of the methods described in relation to FIGS. 3 and 5. In embodiments, processing system 402 may include a single, or any multiple number of processors, as will be understood by those of skill in the art.

Storage system 404 may be an electronically readable medium or a computer readable medium configured to store computer program instructions. In examples, storage system 404 may include a non-transitory medium. Stored computer program instructions, when executed on the processing system 402, may perform a portion or all of the methods described in relation to FIGS. 3 and 5.

In examples, processing system 402 and storage system 404 may be incorporated into a custom chipset, such as a system on a chip.

In examples, portions of the methods described in relation to FIGS. 3 and 5 may be stored or executed outside of electronics 400. For example, a portion of the methods described in relation to FIGS. 3 to 5 may be stored or executed on a combination of a server and cloud storage facility via the Internet.

Interface 406 may be configured to communicate with devices external to electronics 400. Through interface 406, electronics 400 may communicate with first pressure sensor 204. Interface 406 may further communicate with a meter electronics 20 internal to Coriolis flow meter 202, or an external control room computer.

In embodiments, electronics 400 may comprise meter electronics 20. In further embodiments, however, electronics 400 may comprise a separate electronics in communication with a meter electronics 20.

FIG. 5 depicts a flow meter correction system 500 in accordance with an embodiment. Flow meter correction system 500 may be used to correct a flow variable based on an inner pressure inside a Coriolis flow meter 202 within flow meter system 200.

Flow meter correction system 500 comprises a first pressure receiving module 502. First pressure receiving module 502 is configured to receive a first outside pressure 503 from a first pressure sensor 204 located in a first process conduit 208a positioned on a first end 212a of the Coriolis flow meter 202. In embodiments, pressure receiving module 502 may execute step 302 of method 300, as described above.

Flow meter correction system 500 further comprises a second pressure receiving module 504. Second pressure receiving module 504 is configured to determine a second outside pressure 505 in a second process conduit 208b positioned on a second end 212b opposing the first end 212a of the Coriolis flow meter 202. In embodiments, second pressure receiving module 504 may execute step 304 of method 300, as described above.

Flow meter correction system 500 further comprises an inner flow meter pressure estimation module 506. Inner flow meter pressure estimation module 506 is configured to determine an estimated inner flow meter pressure 507 based on the first outside pressure 503 and the second outside pressure 505. In embodiments, inner flow meter pressure estimation module 506 may execute step 306 of method 300 or any variations thereof that are described above.

Flow meter correction system 500 further comprises a flow variable receiving module 508. Flow variable receiving module 508 is configured to receive a flow variable 509. In embodiments, flow variable receiving module 508 may execute step 308 of method 300, as described above.

Flow meter correction system 500 further comprises a flow variable correction module 511. Flow variable correction module 511 is configured to generate a corrected flow variable 512 based on the estimated inner flow meter pressure 507, a pressure compensation factor 510, and the flow variable 509. In embodiments, flow variable correction module 511 may execute step 310, as described above.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. Accordingly, the scope of the embodiments described above should be determined from the following claims.

The invention claimed is:

1. A method for correcting a flow variable (509) based on an inner pressure inside a Coriolis flow meter (202), the method comprising:
receiving a first outside pressure (503) measured with a first pressure sensor (204) located in a first process conduit (208a) positioned on a first end (212a) of the Coriolis flow meter (202);
determining a second outside pressure (505) in a second process conduit (208b) positioned on a second end (212b) opposing the first end (212a) of the Coriolis flow meter (202);
determining an estimated inner flow meter pressure (507) based on the first outside pressure (503) and the second outside pressure (505);
receiving the flow variable (509); and
generating a corrected flow variable (512) based on the estimated inner flow meter pressure (507), a pressure compensation factor (510), and the flow variable (509), wherein the pressure compensation factor is correlated to a pressure inside a flow tube of the Coriolis flow meter (5).

2. A method as claimed in claim 1, wherein determining the second outside pressure (505) is based on a pressure loss coefficient, a fluid velocity, a fluid viscosity, and a density.

3. The method as claimed in claim 1, wherein determining the second outside pressure (505) further comprises receiving a second outside pressure measurement from a second pressure sensor (206) located in the second process conduit (208b).

4. A method as claimed in claim 1, wherein determining the estimated inner flow meter pressure (507) based on the first outside pressure (503) and the second outside pressure (505) further comprises averaging the first outside pressure (503) and the second outside pressure (505).

5. A method as claimed in claim 1, wherein determining the estimated inner pressure is further based on a cross-sectional area of a process conduit, a diameter of the process conduit, a cross-sectional area of the flow tube of the Coriolis flow meter (202), a measured density p, and a measured flow rate M.

6. A method as claimed in claim 1, wherein the flow variable (509) is at least one of: a mass flow, a volume flow, or a density.

7. A method as claimed in claim 1, wherein determining the estimated inner flow meter pressure (507) is further based on a flow meter direction.

8. An electronics for correcting a flow variable (509) based on an inner pressure inside a Coriolis flow meter (202), the electronics comprising an interface for receiving a first outside pressure (503) from a first pressure sensor (204), and a processing system in communication with the interface, with the processing system configured to:

receive a first outside pressure (503) measured with a first pressure sensor (204) located in a first process conduit (208a) positioned on a first end (212a) of the Coriolis flow meter (202);

determine a second outside pressure (505) in a second process conduit (208b) positioned on a second end (212b) opposing the first end (212a) of the Coriolis flow meter (202);

determine an estimated inner flow meter pressure (507) based on the first outside pressure (503) and the second outside pressure (505);

receive the flow variable (509); and generate a corrected flow variable (512) based on the estimated inner flow meter pressure (507), a pressure compensation factor (510), and the flow variable (509), wherein the pressure compensation factor is correlated to a pressure inside a flow tube of the Coriolis flow meter.

9. An electronics as claimed in claim 8, wherein the processing system is further configured to determine the second outside pressure (505) based on a pressure loss coefficient, a fluid velocity, a fluid viscosity, and a density.

10. An electronics as claimed in claim 8, wherein the processing system is further configured to determine the second outside pressure (505) by receiving a second outside pressure measurement from a second pressure sensor (206) located in the second process conduit (208b).

11. An electronics as claimed in claim 8, wherein the processing system is further configured to determine the estimated inner flow meter pressure (507) based on the first outside pressure (503) and the second outside pressure (505) by averaging the first outside pressure (503) and the second outside pressure (505).

12. An electronics as claimed in claim 8, wherein the processing system is further configured to determine the estimated inner pressure based on a cross-sectional area of a process conduit, a diameter of the process conduit, a cross-sectional area of a flow tube of the Coriolis flow meter (202), a measured density p, and a measured flow rate M.

13. An electronics as claimed in claim 8, wherein the flow variable (509) is at least one of: a mass flow, a volume flow, or a density.

14. An electronics as claimed in claim 8, wherein determining the estimated inner flow meter pressure (507) is further based on a flow meter direction.

15. A flow meter correction system configured to correct a flow variable (509) based on an inner pressure inside a Coriolis flow meter (202), the system comprising:

a first pressure receiving module configured to receive a first outside pressure (503) from a first pressure sensor (204) located in a first process conduit (208a) positioned on a first end (212a) of the Coriolis flow meter (202);

a second pressure receiving module for determining a second outside pressure (505) in a second process conduit (208b) positioned on a second end (212b) opposing the first end (212a) of the Coriolis flow meter (202);

an inner flow meter pressure estimation module configured to determine an estimated inner flow meter pressure (507) based on the first outside pressure (503) and the second outside pressure (505);

a flow variable receiving module configured to receive a flow variable (509); and a flow variable correction module configured to generate a corrected flow variable (512) based on the estimated inner flow meter pressure (507), a pressure compensation factor (510), and the flow variable (509), wherein the pressure compensation factor is correlated to a pressure inside a flow tube of the Coriolis flow meter (202).

16. A flow meter correction system as claimed in claim 15, wherein the second pressure receiving module is further configured to determine the second outside pressure (505) based on a pressure loss coefficient, a fluid velocity, a fluid viscosity, and a density.

17. A flow meter correction system as claimed in claim 15, wherein the second pressure receiving module is further configured to receive a second outside pressure measurement from a second pressure sensor (206) located in the second process conduit (208b).

18. A flow meter correction system as claimed in claim 15, wherein the inner flow meter pressure estimation module is further configured to average the first outside pressure (503) and the second outside pressure (505).

19. A flow meter correction system as claimed in claim 15, wherein the inner flow meter pressure estimation module is further configured to determine the estimated inner pressure based on a cross-sectional area of a process conduit, a diameter of the process conduit, a cross-sectional area of a flow tube of the Coriolis flow meter (202), a measured density p, and a measured flow rate M.

20. A flow meter correction system as claimed in claim 15, wherein the flow variable (509) is at least one of: a mass flow, a volume flow, or a density.

21. A flow meter correction system as claimed in claim 15, wherein the inner flow meter pressure estimation module is further configured to determine the estimated inner flow meter pressure (507) based on a flow meter direction.

\* \* \* \* \*